United States Patent [19]

Moxon

[11] Patent Number: 4,516,164
[45] Date of Patent: May 7, 1985

[54] APPARATUS FOR DECODING VIDEO ADDRESS CODE SIGNALS

[75] Inventor: Edwin C. Moxon, Boxboro, Mass.

[73] Assignee: Stypher Corporation, Hudson, Mass.

[21] Appl. No.: 435,689

[22] Filed: Oct. 21, 1982

[51] Int. Cl.³ .......................... G11B 5/02; G11B 5/09
[52] U.S. Cl. .................................. 360/53; 360/14.1; 360/39; 360/49; 369/59; 369/60
[58] Field of Search .............. 358/335, 339; 360/33.1, 360/9.1, 13, 14.1, 14.3, 14.2, 36.1, 36.2, 39, 49, 53; 371/30; 369/59, 60

[56] References Cited

U.S. PATENT DOCUMENTS 4,065,787 12/1977 Owen et al. ............... 360/36.2 X
4,322,757 3/1982 Hatakeyama ................. 360/14.2

Primary Examiner—Robert L. Richardson
Attorney, Agent, or Firm—Wolf, Greenfield & Sacks

[57] ABSTRACT

Apparatus for decoding digitally-coded address signals embedded in video signals recorded on magnetic tape is disclosed. The apparatus can properly decode the address signals at both slow and fast tape speeds and utilizes a variable-frequency oscillator to generate timing signals for decoding the digitally-coded address. The address signals encoded on the magnetic tape normally include an error code which can be detected by conventional error checking circuitry and used to check whether the address signals have been correctly received. The oscillator frequency is adjusted in accordance with an error signal generated by the error checking circuitry until error-free detection of the address signals is achieved.

25 Claims, 4 Drawing Figures

APPARATUS FOR DECODING VIDEO ADDRESS CODE SIGNALS

FIELD OF THE INVENTION

This invention relates to apparatus for decoding digital address signals encoded with a video signal on video magnetic tape and in particular to apparatus for decoding a vertical interval time code (VITC) recorded on the magnetic tape.

BACKGROUND OF THE INVENTION

In video magnetic tape recorders encoded address information is often periodically recorded along with the video information on the magnetic tape. During subsequent editing of the tape, the encoded information can be read and decoded and the resulting position information used to position the tape precisely within the editing apparatus. To perform editing operations efficiently, it is desirable to have the ability to read the code signals when the tape is moving either at rewind or fast forward speeds so that the coded information can be used to roughly position the tape prior to beginning editing.

There are at least two types of code signals which are in general use at the present time. One of these code signals is a longitudinal time code signal which is recorded longitudinally on the magnetic tape in a separate audio track or cueing track which accompanies the video information.

Another type of time code signal commonly used is known as the vertical interval time code (VITC) signal. In contrast to the SMPTE time code signal, the VITC signal is embedded in the video information and recorded on the video recording track itself rather than an accompanying track. Normally, the VITC signal contains encoded information relating to the relative time at which the corresponding tape location was written and includes hour, minute, second, frame and field information and also a conventional CRC error correcting code which can be used to check for coding and reception errors.

The same VITC signal code is conventionally encoded in two non-adjacent horizontal periods within the vertical blanking interval of each video field. The coded information does not interfere with the reproduced picture because the the video signal is normally blanked during the vertical interval to allow time for the monitor scanning beam to retrace.

The VITC signal is encoded on the magnetic tape at a fixed clock or "bit" rate so that it can be decoded easily during normal editing operations when the tape is moving at normal playback speed or is stopped. It is convenient, however, to be able to decode the VITC signals at fast tape speeds in order to detect relative tape position when the tape is being run in the fast-forward or rewind mode prior to actual editing.

A problem has arisen with some prior art VITC decoding circuitry in that the VITC signal is normally decoded from the composite video signal read from the magnetic tape with circuitry that uses a local oscillator of fixed frequency. In such circuitry, the decoding oscillator is synchronized to the signals read from the tape and used to sample the incoming data stream at the normal playback bit rate. However, in some tape recording formats, the effective bit rate of the signal read from the tape varies with the tape speed over the tape recorder read head. As the tape speed increases, such as during rewind or fast forward motions, the bit rate of the composite signal read from the tape also increases. When the increased bit rate varies significantly from the normal playback bit rate, a decoding circuit which uses a fixed-frequency oscillator to sample the incomimg waveform will not satisfactorily decode the signal.

Accordingly, other prior art address decoding circuits were developed which used the VITC signal to generate address information only when the tape was moving at playback speeds or was stopped. At high tape speeds the longitudinal time code was used to check position. These prior art circuits suffered from the difficulty that they required both the VITC signal and the longitudinal code to be recorded on the tape and accordingly required circuitry which could decode both types of signals.

Other prior art arrangements were developed in which the local decoding oscillator frequency is varied in proportion to the tape speed by electronically measuring the tape speed and ajusting the oscillator frequency accordingly. In these systems the tape speed is measured by detecting the time interval occurring between two fixed points on the tape such as the time interval occurring between two horizontal synchronization pulses. These latter systems suffered from additional problems in that they were subject to interference from electrical noise and the circuitry needed to check the tape speed was complex and costly.

It is an object of the present invention to derive a decoding clock rate which can be used to correctly decode the VITC signal when the tape on which the VITC signal is encoded is either stopped or running at slow or fast speeds.

It is another object of the present invention to provide apparatus in which a clock rate for decoding the VITC signal can be derived without using complex circuitry.

It is yet another object of the present invention to provide apparatus which can derive a VITC signal decoding clock rate even in the presence of noise or extraneous signals.

SUMMARY OF THE INVENTION

The foregoing problems are solved and the foregoing objects are achieved in one illustrative embodiment of the invention in which a programmable variable-frequency oscillator is substituted for the normal fixed-frequency oscillator used in a conventional VITC signal decoder. The decoding circuitry initially attempts to decode the VITC signal by adjusting the programmable oscillator to generate an initial "trial" frequency (usually the playback frequency). Standard error detection and correction circuitry is used to monitor the CRC error code which is encoded with the address information in the VITC signal. The output of the error detection circuitry is monitored by a computer which can control the decoding frequency generated by the local oscillator. If the error detection circuitry indicates that the VITC signal has been decoded correctly, using the trial decoding frequency, the trial frequency is selected as the decoding frequency. If the error correction circuitry indicates that the VITC code has been decoded erroneously, the programmable oscillator frequency is changed by the computer to a slightly higher decoding frequency which is used as a second trial decoding frequency. Another decoding error causes the apparatus to choose a third trial decoding frequency slightly lower than the initial trial frequency. A still further error causes the system to try the playback frequency again. Continuing decoding errors cause further adjustment of the programmable oscillator to generate trial decoding frequencies of sequentially higher and lower frequencies (in alternating sequence) interspersed with the playback frequency and the oscillator frequency last known to have produced error-free decoding until the VITC signal is received in an error-free condition.

DETAILED DESCRIPTION OF THE INVENTION

Figure 1:
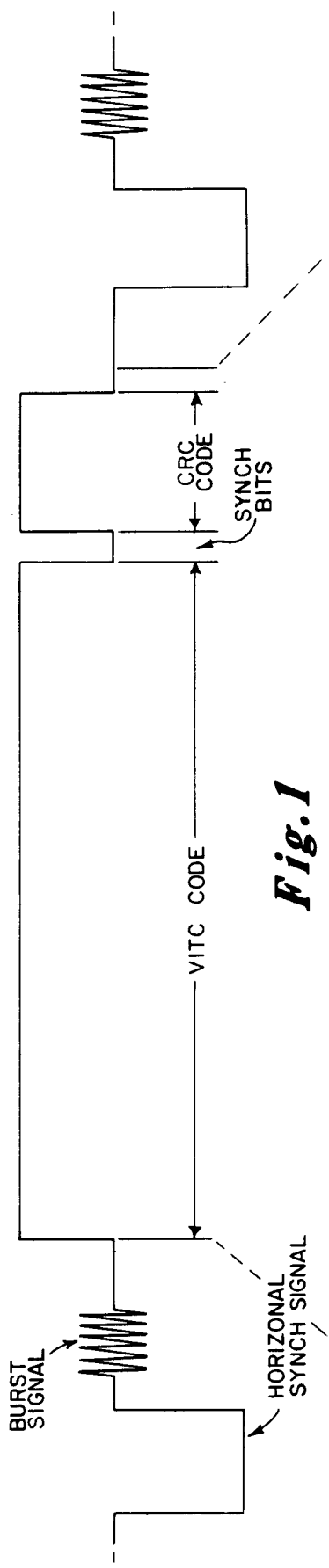
FIG. 1 is an illustrative video waveform showing the location at which a VITC signal is inserted.

FIG. 1 is an electrical waveform showing where the vertical interval time code is inserted into a standard video signal. The VITC code occupies the same space as the normal video signal, that is, it is located above the pedestal voltage and is inserted in the horizontal line directly after the color burst signal so that the first bit of the code begins approximately 10.5 microseconds after the 50% of amplitude point of the leading edge of the horizontal sync pulse.

In accordance with well-known standards, the waveform shown in FIG. 1 is inserted into the vertical blanking interval in two non-adjacent horizontal lines between line 10 and line 20 and occupies the same line numbers for all video fields. The complete VITC code consists of 90 bits which are recorded on the magnetic tape at a bit rate that is a predetermined function of the horizontal line rate. The code specifies a frame location on the tape in terms of an hour count number, a minute count number, a second count number and a frame count number. Each of the count numbers is coded in binary-coded decimal notation using a modified NRZ modulation method. A more complete description of the encoding waveforms and timing a the standard VITC code is given in the SMPTE Journal, September 1981 which description is hereby incorporated by reference.

Figure 2:
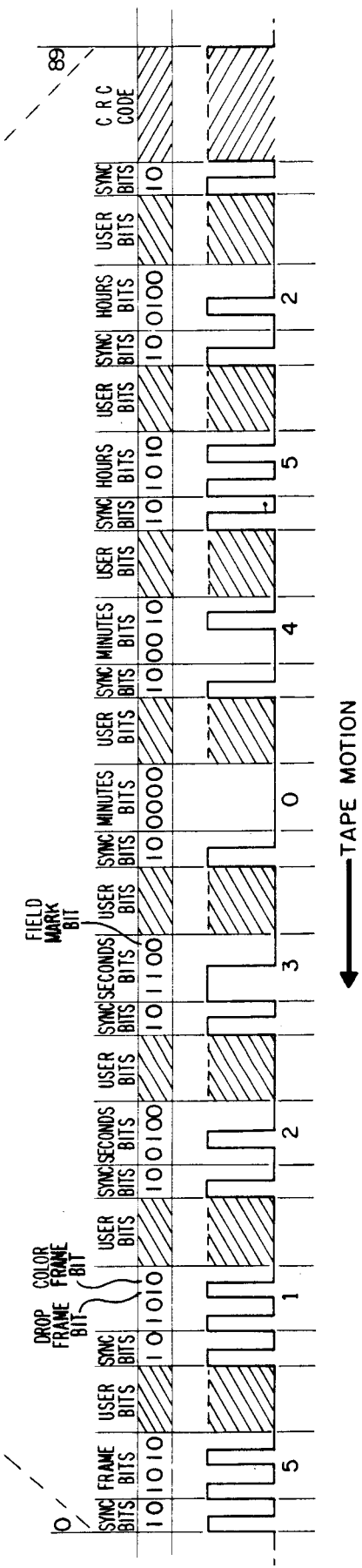
FIG. 2 is an illustrative VITC signal as recorded on a length of magnetic tape.

FIG. 2 shows an expanded view of the actual structure of the code numbers as recorded on a section of video magnetic tape. For synchronization purposes, a fixed synchronization pattern (consisting of a digital "1" followed by a digital "0") is periodically encoded on the tape at ten bit intervals. Located between the synchronization bit patterns are a group of information bits recorded in a predetermined pattern which specify the address numbers followed by a group of bits which may be specified independently by the user.

The section of magnetic tape shown in FIG. 2 contains an encoded address corresponding to 25 hours, 40 minutes, 32 seconds and 15 frames. Accordingly, the first four address bits shown on the left following an initial synchronization pattern are encoded with the binary coded decimal for five ("1010").

Four user bits follow the frame bits which are, in turn, followed by a pair of synchronization bits. Since, according to convention, there can be no more than 30 frames (numbered 0–29) only two bits are necessary to encode the most significant bit of the frame address number. In FIG. 2 this bit is encoded as a 1. One of the remaining two bits of the four bit frame address field is used for a "drop frame" bit which is used to indicate whether, during a continuous recording, certain address numbers are omitted from a continuous chain of addresses in order to resolve a timing difference due to the manner of processing color television signals.

The other bit of the frame address number is used for the "color field" bit which is used to convey information regarding the encoding of color information in the signal.

The drop frame bit and color field bit are followed by a group of four user bits and two sync bits, respectively. The remaining least significant and most significant bits of the seconds code, minutes code or hours code are recorded similarly. Since the most significant bit of the seconds number cannot be greater than 5 only three bits are used to encode this infomation. The remaining bit of the four bit group is used to record the field code bit which indicates the field of the specified frame into the code is inserted (a "0" is inserted into this location when the code is located in the first field and a "1" is inserted for the second field).

The actual address code information including the user specified bits ends with the eigth user's bit group including bit number 79. Bits 80 and 81 are synchronization bits in the standard "10" pattern. Bits 82–89 are encoded with a cyclic redundancy check (CRC) code that is a standard error detecting code that is generated by well-known circuitry.

Figure 3:
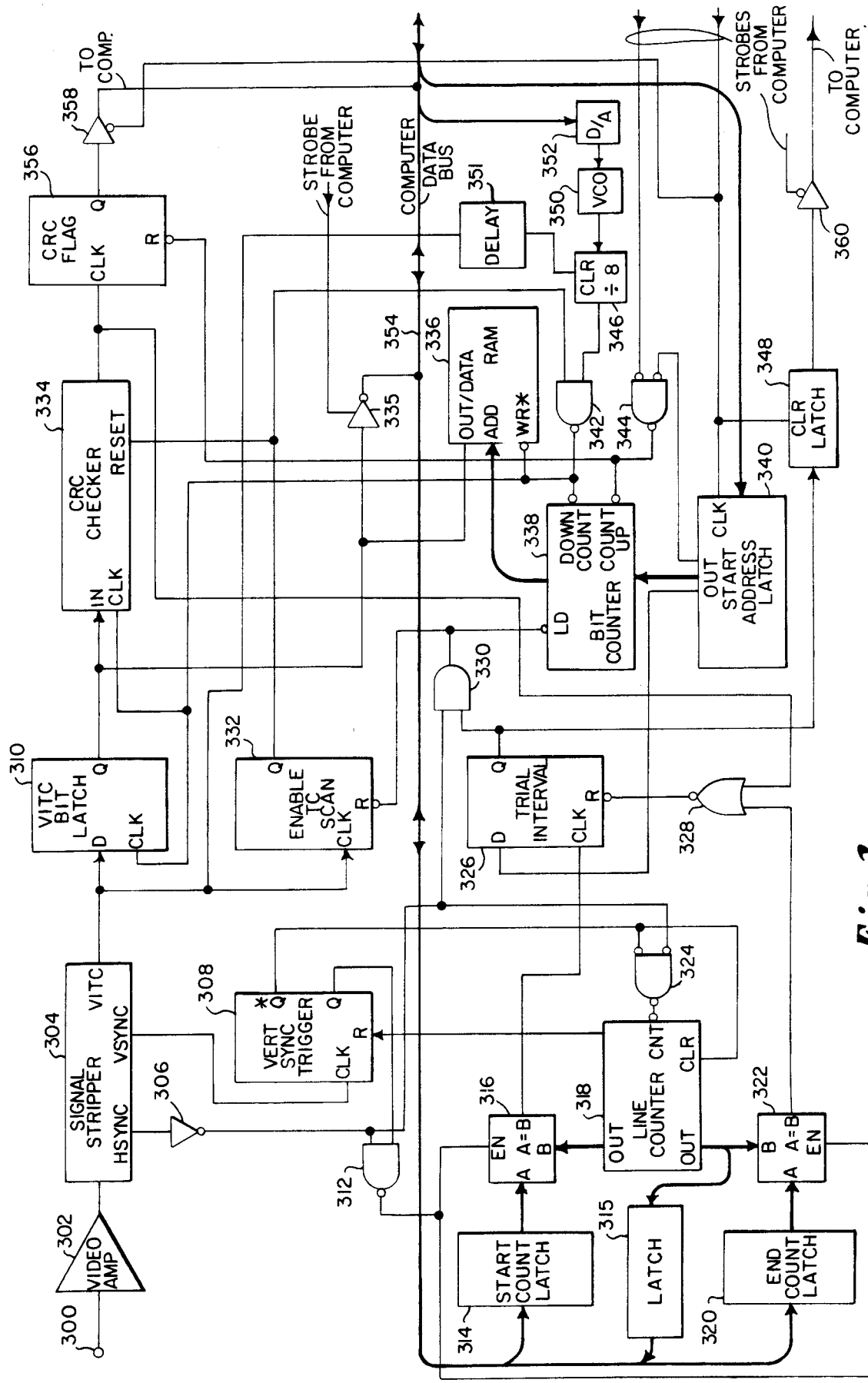
FIG. 3 is a block diagram the inventive VITC signal decoding apparatus.

FIG. 3 of the drawing is a detailed block diagram of illustrative reader circuitry which is used to decode the signal generated from the magnetic tape as the tape is run at various speeds, including fast-forward, rewind, normal playback speeds or stopped. The decoding circuitry is controlled and coordinated by a computer (not shown) by means of information placed on data bus 354 and associated command leads. Although bus 354 is shown as a single line, it actually consists of eight signal lines which are bi-directional to allow commands to be issued from the computer and provided to the circuitry and to allow data generated by the circuitry to be forwarded to the computer.

In accordance with the invention, the computer controls the frequency of a local oscillator in the decoding circuitry to search in a predetermined pattern for a decoding clock rate which will allow proper reception of the VITC signals even though the video magnetic tape recorder may be running at normal playback speed, rewind speed or fast-forward speed. In particular in order to properly decode a VITC signal, the decoding circuitry must first locate the horizontal lines in which the VITC signal is recorded. After the proper group of lines is located, the incoming signals in the line must be sampled by the local oscillator which is synchronized to the signal in order to obtain the VITC information. During the sampling operation the incoming signals must be stored so that the encoded information can be used if it has been received properly. Finally, the received signal must be checked to insure that it has been received properly. If the incoming VITC information has not been received properly the local oscillator frequency must be changed and the decoding operation started again.

Accordingly, the circuitry shown in FIG. 3 has five main parts. The first part consists of the circuitry which is used to separate the horizontal and vertical sych signals and the VITC code from the composite video signal produced from the tape recorder read head.

Specifically, video signals generated by the read head of the video magnetic tape recorder (not shown) enter the decoding circuitry via terminal 300 and are provided to video amplifier 302 which is a well-known electronic circuit which amplifies the signals to provide sufficient signal strength to operate the remainder of the circuitry. The amplified video signals are provided from the output of video amplifier 302 to signal stripper 304. Stripper 304 contains well-known analog circuitry which filters the amplified signals to removed the 3.58 megahertz color burst signals and other unwanted high frequencies, clamps the circuit to restore the D.C. level and separates the VITC signal, horizontal sync pulses and the vertical sync pulses. The VITC signal is generated at the VITC output of stripper 304 and short positive pulses are provided at the horizontal and vertical sync outputs upon reception of the appropriate sync signal.

Since the VITC code can be located on any horizontal line from lines 10 through 20 it is necessary for the reader circuitry to search over the lines within the given range in order to determine on which lines the VITC code is located. The second main part of the decoding circuitry including latches 314, 315, and 320 and line counter 318 performs this function.

In particular, for convenience, the decoding circuitry can be user-programed to search over a predetermined horizontal line range including lines 10–20. In order to set the desired range, the user sets the beginning line number and the ending line number of the range on rotary switches which communicate the range information to the computer. The computer then digitizes the starting and ending values and controls the decoding circuitry to search from the starting value to the ending value for the VITC code.

More particularly, the computer loads the starting line count into latch 314 and the ending line count into latch 320 by placing the information on data bus 354 and generating a control pulse on leads (not shown) connected to latches 314 and 320.

The output of start count latch 314 is provided to one input of bit-by-bit comparator 316; similarly, the output of end count latch 320 is provided to one input of bit comparator 322. Comparators 316 and 322, when enabled, compare the counts stored in latches 314 and 320 to the output of line counter 318. Comparators 316 and 322, in turn, are enabled by timing circuitry controlled by the sync outputs of signal stripper 304. In particular, the vertical sync signal generated by stripper 304 is used to clock sync trigger flip/flop 308. Since the VITC code cannot occur before the vertical synchronization signal has been received, the outputs Q and Q* of flip/flop 308 are used to initiate and control the operation of the decoding circuitry.

The Q output of flip/flop 308 is applied to one input of NAND gate 312 and gate 312 is thus enabled after a vertical sync pulse has been received and has "set" flip/flop 308. The other input of NAND gate 312 is provided with an inverted timing pulse generated upon reception of a horizontal sync pulse produced by inverter 306. Due to inverter 306, NAND gate 312 will inhibit comparators 316 and 322 until the end of the horizontal sync pulse when the output of stripper 304 becomes "high". This inhibition allows line counter 318 to settle and prevents false operation.

Line counter 318 is incremented by gate 324 which is, in turn, enabled when flip/flop 308 is "set" by a vertical sync pulse, as previously described. In particular, "set" flip/flop 308 applies a "low" signal to the upper input of gate 324 from its Q* output. The lower input of gate 324 is connected to the output of inverter 306 and thus counter 318 is incremented at the end of each horizontal sync pulse.

Accordingly, during each horizontal interval, counter 318 is incremented and then comparators 316 and 322 are enabled to compare the incremented line count to the starting and ending line count numbers stored in latches 314 and 320. Operation continues in this manner until the output of counter 318 equals the start count stored in latch 314. When this occurs, comparator 316 applies a clocking signal to clock trial interval flip/flop 326.

The response of flip/flop 326 to the clocking signal depends upon the signal applied to its D input from start address latch 340. Start address latch 340 is loaded by the computer, via data bus 354, and contains an address which, as will hereinafter be described, is used to address random access memory 336 and control bits. The control bit is used by the microcomputer to indicate that it is not processing time code information and instead is expecting the decoding circuitry to perform a time code "scan". Normally this bit is set to a "1" to start the scanning operation in the circuitry shown in FIG. 3.

The "1" or "high" signal is applied, via lead 329, to the D input of flip/flop 326. Accordingly, when a clock signal is received from the output of the comparator 316, flip/flop 326 is "set" indicating that the starting line count has been reached and the circuitry is ready to process incoming code signals for each succeeding line until the ending line count is reached.

The next major portion of the circuitry is the decoding circuitry which receives and decodes the incoming VITC code. This circuitry consists of VITC latch 310 and a variable frequency oscillator consisting of D/A converter 352, voltage controlled oscillator 350 and divider 346.

Specifically, when flip/flop 326 is "set" by the line counter circuitry as previously described, the "high" signal at its Q output is provided to AND gate 330, enabling it. Gate 330 is thereby controlled via the output of inverter 306 and the horizontal output of signal stripper 304. In particular, during a horizontal sync pulse, as previously described, a "high" signal is produced from stripper 304 which is inverted by inverter 306 and applied to the the left input of AND gate 330. Gate 330, thereupon, applies a "low" signal to the reset input of flip/flop 332 resetting it. At the end of the horizontal sync pulse, inverter 306 produces a "high" signal which enables AND gate 330, removing the resetting signal from flip/flop 332.

Flip/flop 332 is used to start the checking of the incoming video information for the VITC code. While in the reset state it provides a "low" signal at its Q output which is applied to CRC checker 334 resetting it so that it can begin checking the incoming code, as will be hereinafter described. Flip/flop 332 is "set" by the leading edge of the first VITC signal received from signal stripper 304 and the "high" signal at the Q output of "set" flip/flop 332 is applied to NAND gate 342 to enable it, which as will hereinafter be described, enables clock pulses produced by the programmable clock to be applied to the down count input of bit counter 338. In addition "set" flip/flop 332 removes the low signal from the reset input of CRC checker 334 enabling it to begin checking incoming VITC signals.

VITC signals are also provided to the D input of latch 310. Latch 310 is controlled to sample the VITC signals by the output of gate 342 which is, in turn, controlled by a programmable clock consisting of D/A converter 352, voltage controlled oscillator 350 and divide by eight counter 346.

In accordance with one aspect of the invention, the computer sets the decoding frequency of the oscillator by means of D/A converter 352 in accordance with a predetermined scheme, as will hereinafter be described. In order to set the decoding frequency, the computer provides an 8-bit command word to D/A converter 352 over data bus 354. D/A converter 352 is a well-known device which provides an analog output corresponding to signals received as digital inputs. The analog output is a voltage which is applied to voltage controlled oscillator 350 and the frequency of oscillator 350 is thereby controlled in accordance with the data word applied to D/A converter 352.

In particular, oscillator 350 is controlled to oscillate at eight times the expected bit rate of the VITC information. The output of oscillator 350 is applied to divide-by-eight counter 346 which thereupon applies clock pulses to NAND gate 342 at the expected bit rate. Counter 346 is synchronized to the incoming VITC information by means of delay 351. In particular, the first rising edge of the VITC information which clocks flip/flop 332 also, after a short delay introduced by delay 351, resets counter 346.

After being synchronized, counter 346 begins counting and after eight counts its output becomes "low" disabling NAND gate 342. The output of NAND gate 342 thereupon becomes "high", clocking latch 310 and latching the first VITC bit into the system. In addition, the "high" signal produced by gate 342 clocks CRC checker 334 to begin processing the first received VITC bit.

CRC checker 334 is the fourth main part of the decoding circuitry and is a well-known circuit which checks the incoming code to be sure it has been properly received. It may be implemented in the conventional fashion using a shift register with exclusive OR gate feedback. The output of CRC checker 334 becomes "high" if the entire VITC signal word has been properly received.

In accordance with the invention as will hereinafter be described, the output of CRC checker 334 is used by the computer to determine whether or not the proper decoding frequency has been used. In particular, the computer selects a decoding frequency which causes error-free reception of the VITC signal. If an error is detected, as indicated by a "low" output of CRC checker 334, then the computer executes a predetermined sequence, selecting various frequencies until an error-free reception of the VITC signal is obtained.

The fifth and final portion on the decoding circuitry is the temporary storage circuitry which is used to store the incoming VITC bits until a determination is made whether the code has been received correctly. The storage circuitry consists of address latch 340, bit counter 338 and RAM 336.

In particular, the "low" signal produced by enable flip/flop 332 when it is in the reset state is also applied to the load input of bit counter 338 causing it to load information contained in latch 340. Prior to starting a decoding trial, the computer loads a starting address for RAM 336 into latch 340 via data bus 354. The starting address specifies a location at which the incoming information is to be temporarily stored.

After the first VITC bit has been strobed into latch 310 by a "low" signal at the output of divider 346, one-half bit time later the output of divider 346 goes "high" enabling gate 342. Gate 342, thereupon, applies a "low" signal to its output which "low" is applied to the write input (WR*) of RAM 336. The output of latch 310 containing the first received VITC bit is thereby written into the starting address loaded into bit counter 338. In addition, the "low" output of gate 342 is applied to the down count input of bit counter 338 causing it to decrement to a new address.

The storing process is repeated for each new incoming VITC bit until 82 bits have been stored in RAM 336. The circuitry then begins processing the next eight CRC check bits. If all 90 bits have been received correctly a "1" signal will be present at the output of CRC checker 334. This "high" signal clocks CRC flag flip/flop 356 in order to inform the computer that the VITC code has been correctly received. The output of CRC flip/flop 356 can then be examined by the computer by strobing driver 358 which output is provided via computer data bus 354 to the computer to indicate that a VITC code has been properly received.

The "high" signal at the output of CRC checker 334 is also applied to NOR gate 328 causing trial interval flip/flop 326 to be "reset". When flip/flop 326 has been reset a high-to-low transition occurs at its Q output which clocks latch 348 indicating that the trial has been completed. The output of latch 348 is applied to driver 360 which can also be strobed by the computer to check whether the trial scan has been completed.

When a trial has been completed the output of line counter 318 can also be gated onto bus 354 by means of latch 315 so that the computer can store the line number on which a VITC code was properly received.

If a VITC code is not properly received by the end of the horizontal line scan, a horizontal sync pulse appearing at the output of stripper 304 causes a "low" signal to be applied by inverter 306 to AND gate 330 which resets TC scan flip/flop 332. Flip/flop 332, thereupon, applies a "low" signal to the reset input of CRC checker 334 resetting it in preparation for receiving a new VITC code. In addition, NAND gate 342 is disabled by flip/flop 332, thereby preventing counter 338 from being decremented. At the end of the horizontal sync pulse TC scan flip/flop 332 is again enabled to begin the next scanning operation.

Operation continues in this manner until either a VITC code is properly received or until line counter 318 reaches the end line count stored in latch 320 at which time comparator 322 generates a "high" signal which signal is applied to NOR gate 328 causing it to reset trial interval flip/flop 326. Reset flip/flop 326 applies a "low" signal to AND gate 330 disabling it and causing the TC scan flip/flop 332 to remain reset therby ending the decoding of VITC information.

After the computer has determined that a VITC code has been properly received by reading the output of latches 348 and 356 it thereupon, reads the data stored in RAM 336 in order to further process the stored VITC code.

In particular, the computer stores an address and control word in start address latch 340 including a control bit which is a "0". This "low" signal is applied to the lower input of gate 344, enabling the gate. The computer then applies a "low" strobe signal to the upper input of gate 334 which thereupon applies a "low" signal to the count-up input of counter 338. The "low" signal at the output of gate 344 is also applied to the reset input of CRC flag 356 to reset it.

Under control of gate 344, counter 338 increments the address signals applied to RAM 336. Since the write (WR*) input of RAM 336 is held "high" by the output of disabled gate 342, the data stored in the location addressed by the output of bit counter 338 is applied to the out/data lead of RAM 336 and, via driver 335, to data bus 354. Each successive strobe signal applied to gate 344 increases the count of bit counter 338 addressing a new address which is read out via driver 335 to the computer.

As previously explained, the operations of the illustrative VITC code reader is controlled and coordinated by a computer. A computer suitable for use with the illustrative embodiment is a model Z-80 microcomputer manufactured by Zilog Incorporated, Cupertino, Calif.

In accordance with one aspect of the invention, under control of a software program, this computer performs a predetermined routine which adjusts the decoding frequency of the local programmable oscillator until an error-free reading of the VITC signal is received from the reader circuitry.

In particular, the computer monitors the incoming VITC information to detect errors in reception which might indicate an incorrect decoding clock rate. However, since reception errors could also be caused by a number of factors, including noise, to avoid erroneously readjusting the decoding clock rate due to a distrubance caused by noise, before readjusting the clock rate the computer makes six attempts to receive a VITC signal within the specified line range.

If the VITC signal is incorrectly received on all six attempts, the computer then sets the decoding clock rate to a rate corresponding to normal playback speed. If this clock rate does not produce an error-free reading of the VITC code, the last clock rate is incremented by 2% and used as a new clock rate. If the new clock rate still produces reading errors, the last clock rate is decremented by 2%. Next, the last clock rate which is known to have worked is tried. If there is still no valid reading the clock rate is incremented by 4% and then subsequently decremented by 4%. Operation continues in this fashion until the VITC code is received error-free or predetermined limits on the incremented rate and decremented rate are reached at which point a clock rate for the last speed known to have worked is used alternating with the clock rate corresponding to normal playback speed.

Figure 4:
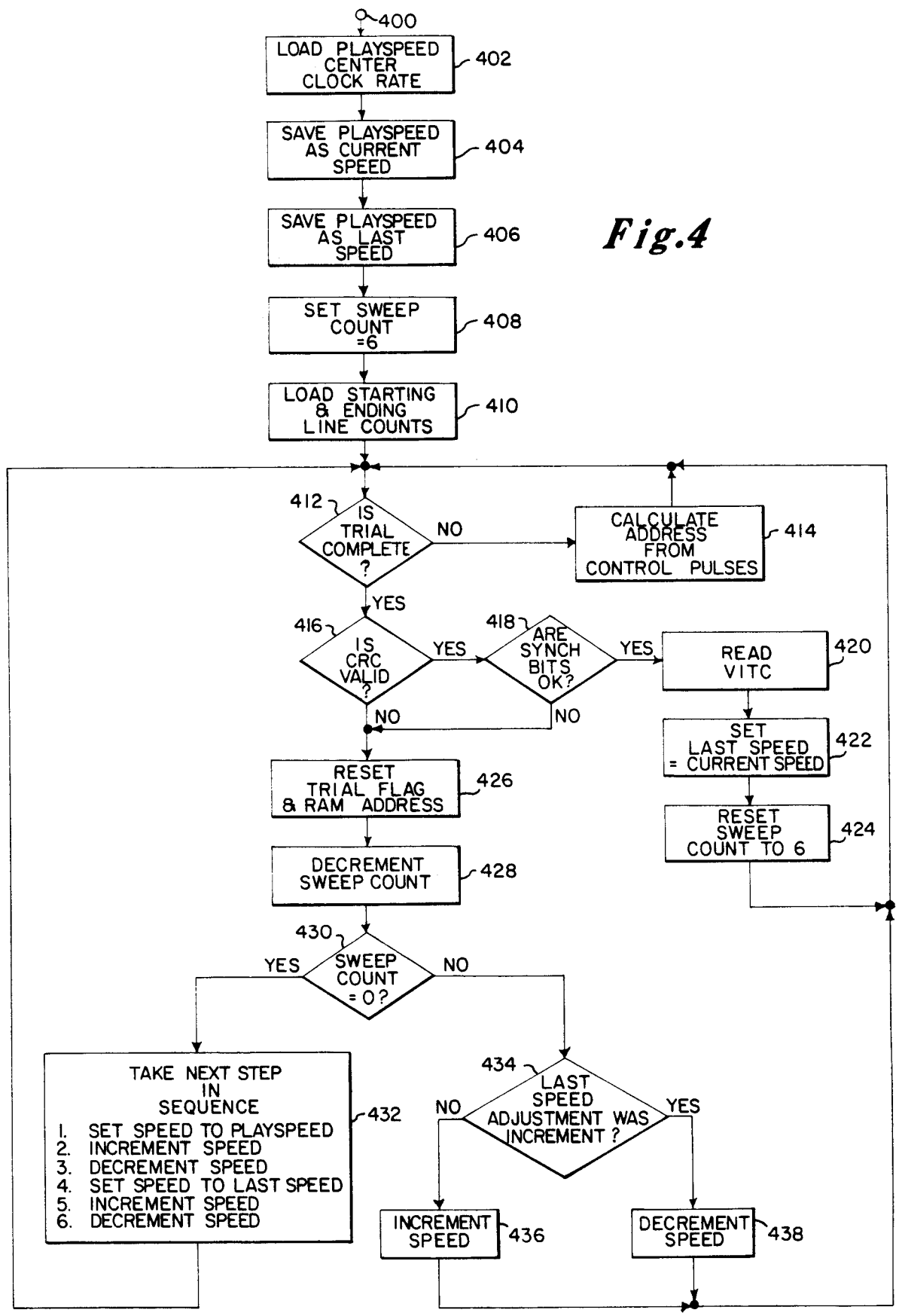
FIG. 4 is a flow chart of the sequence of steps used to in which that local oscillator is adjusted to obtain proper decoding of the VITC signal.

A flow chart for the program which performs the decoding clock adjustment is shown in FIG. 4. Other adjustment routines could also be used, but the routine shown is preferred with the illustrative embodiment. Starting at point 400 the first five steps are used to initialize the decoding circuitry to start a trial decoding of the VITC code. In particular, as shown in step 402, a clock rate corresponding to the center frequency of the expected playback speed is loaded into an appropriate register in the computer. This playspeed clock rate is a fixed clock rate related in a well-known manner to the horizontal scanning rate.

In step 404 the clock rate corresponding to the play speed loaded in step 402 is loaded into the "current speed" register to be saved. In step 406 the "last speed" register is also loaded with clock rate corresponding to the play speed.

In step 408 a "sweep counter" is set to an initial value of six. This counter determines the number of errors which can be received before the clock rate is automatically adjusted by the computer.

In step 410, the computer next loads the starting and ending line counts into the appropriate latches in the decoding circuitry which count numbers are obtained, as previously described, from switches set by the user.

In step 412 the computer monitors the output of the trial latch (latch 348 in FIG. 3) to determine whether a trial attempt at decoding the VITC pulses using the playspeed clock rate has been completed. If the trial has not been completed the computer proceeds to step 414 and calculates address information from control pulses obtained from the tape recorder.

If a trial has been completed, the computer proceeds to step 416 in which it enables driver 358 (FIG. 3) to check the output of the CRC flag flip/flop 356. If the CRC flag flip/flop indicates that the VITC code has been received properly then the computer proceeds to step 418 in which it reads in the synchronization bits from RAM 336 in a manner previously described and checks them against a fixed synchronization bit pattern. A proper synchronization bit code causes the entire VITC code to be read in to the computer, as shown in step 420. Since the trial has resulted in an error-free reading of the VITC code in step 422 the computer sets the clock rate corresponding to the last speed equal to the current speed and in step 424, the sweep counter is reset to the initial value of six. The computer then returns to step 412 and performs another trial reading of the VITC code.

If, on the other hand when the CRC code is checked in step 416, an error is found, the computer proceeds to step 426 in which the trial flag flip/flop is reset and the RAM address (stored in latch 340 in FIG. 3) is reset. In step 428 the computer decrements the sweep counter by 1 to indicate that one error has been received.

In step 430 the computer checks to see whether the sweep counter is 0 which occurs when six errors have been received. If the sweep count is not zero, the computer proceeds to step 434 in which the clock rate for the current speed is changed slightly to ensure that reception errors are not being caused by a clock rate which is nearly correct but causes borderline reception. In particular, as shown in step 434, if the last speed adjustment was an increment, the speed is decremented by 2% as shown in step 438. Alternatively, if the last speed adjustment was not an increment then the speed is incremented by 2% as shown in step 436. In either case the computer proceeds back to step 412 and makes another trial.

If six errors in a row are received, as indicated by the sweep count equaling 0 in step 430, the computer proceeds to step 432 in which it takes a succeeding step in the sequence shown. Each pass through the decoding loop resulting in a reception error causes the computer to advance to the next step of the six steps shown. In particular, the first pass through the decoding loop causes the computer to set a clock rate corresponding to playspeed. Next, the current clock rate is incremented by 2%, then decremented by 2%. The next pass through the loop caused by an error causes the computer to set a clock rate corresponding to the last speed known to have produced an error-free reading. The current clock rate is then incremented by 4% and decremented by 4%. Subsequently, the playspeed clock rate is tried again and then the clock rate is incremented by 6% and decremented by 6%. This operation continues until an error-free reading is obtained or set limits on the incremented and decremented clock rates are reached. When the limits have been reached, clock rates corresponding to the playspeed and last known good speed are alternated.

Although only one illustrative embodiment of the invention is dislosed herein other changes and modifications within the spirit and scope of the invention will become apparent to those skilled in the art, which changes and modifications are intended to be covered by the claims herein.

The following is an example of illustrative computer source program written in opcode for the Z-80 microprocessor which causes the computer to perform the steps shown in FIG. 4:

PROGRAM CODE FOR

APPARATUS FOR DECODING VIDEO
ADDRESS CODE SIGNALS

E. MOXON

10/21/82                    2B406/D700

```
;VIRDZ.Z6  Z80 OPCODES
;VERTICAL INTERVAL TIME CODE READER(MODEL 2600)
;ADAMS SMITH INC -- HUDSON, MA.
;IF UNABLE TO READ VITC THEN ADDRESS IS CALCULATED FROM CONTROL PULSES
;WHEN BROADCASTING USE LD (BC),A (STAX B)  FOR INTERRUPTING PURPOSES
         RSEG    VIRD
;
         PRINT   GEN
         VREQU
;
         ;POWER UP SO INITILIAZE PROGRAM
ZERO:    EQU     *

;0
         DC      'X','X','X','X','X','X','X','X'
         DC      'VIRDZ   '
         ;10
         DC      'X','X','X','X','X','X','X','X'
         DC      'X','X','X','X','X','X','X','X'
         ;20
         DC      'X','X','X','X','X','X','X','X'
         DC      'X','X','X','X','X','X','X','X'
         ;30
         ORG     ZERO+33H
         DC               'X','X','X','X','X'
         DC      'X','X','X','X','X','X','X','X'
         ;40
         DC      'X','X','X','X','X','X','X','X'
         ;50
         DC      'X','X','X','X','X','X','X','X'
         DC      'X','X','X','X','X','X','X','X'
         ;60
         DC      'X','X','X','X','X','X'
         ORG     ZERO+69H
         DC           'X','X','X','X','X','X','X'
         ;70
         DC      'X','X','X','X','X','X','X','X'
         DC      'X','X','X','X','X','X','X','X'

ORG     ZERO
         NOP
         JP      START

ORG     ZERO+38H
INTRPT:
         JP      INTSVC          ;SERVICE INTERUPT

ORG     ZERO+3DH
START:   NOP
         LD      (CLRINT),A      ;WRITE TO MEM IS PULSE TO CLR INT FF
         LD      SP,HIMEM        ;SET STACK
         IM      1               ;SET INTERUPT MODE 1
```

```
            EI                          ;ENABLE INTERUPTS
            CALL    CLRM                ;CLEAR MEMORY TO 0
            IN      A,(CTCTR)           ;IN ON CONTROL TRACK COUNTER TO CLEAR IT
            LD      A,0D2H              ;FIRST BIT WRITTEN
            OUT     (VRDAD),A           ;SELECT ADDR  TO INITILIAZE READER
            LD      A,1
            OUT     (DSPSET),A          ;SET UP DISPLAY FOR HEXIDECIMAL
;INITIALIZE LOCAL POOL RAM
            LD      HL,4000H
            LD      B,32                            ;32 DEVICES
            LD      C,32                            ;32 LOCS
PRIL1:      IN      A,(83H)             ;KEEP AUTO-RESET HAPPY
            LD      (HL),0FH
            INC     HL
            DEC     C
            JR      NZ,PRIL1
            LD      C,32
            DEC     B                   ;MORE DEVICES?
            JR      NZ,PRIL1

LD      A,30H
            LD      (TCMD),A            ;INITILIAZE MODE TO 30 FR(IT MAY CHANGE AFTER 1
;INITIALIZE COMMON TCMD BUS AREA, WAIT FOR WRITEOVER
            LD      (41F8H),A           ;FIXED DATA LOCATION IN BUS DEVICE 0
                    ;0 IS 30 FR

CALL    INIPDF              ;SPECIAL 2SEC ANNOUNCE OF ID POSITION
;INIT SWEEPPARAMETERS
            LD      A,PLYCF             ;PLAY CENTER FREQ
            LD      (CURSPD),A          ;SAVE PLAYSPEED AS CURRENT
            LD      (LSTSPD),A          ;SAVE          LAST SPEED
            LD      A,0FH
            LD      (SWPCT),A           ;SET SWEEP COUNT
;*******************
;MAIN LOOP OF PROGTRAM
;FIRST SEE IF DATA IN
MAIN:       NOP
            CALL    LINSET              ;SET UP LINES SCANNED FROM SWITCH INFO
            CALL    ADRCLC              ;GET ADDRESS OF THIS DEVICE
            CALL    CKBCMD              ;CHECK ASCII BUS COMMANDS
            CALL    DSPSVC
            IN      A,(VFLAGS)          ;CHECK FOR TRIAL COMPLETE
            AND     4
            JP      NZ,CHKTC            ;OK SO SEE IF TC GOOD
            IN      A,(CTCTR)           ;NO TC SO SEE IF UPDATE FROM PULSES
            LD      (CTRVAL),A          ;SAVE COUNTER VALUE
            AND     7FH                 ;MASK OFF SIGN
            JP      NZ,UPCNT            ;UPDATE COUNT
;NO DATA SO CONTINUE POLLED IO LOOP
MAINX:      CALL    CK60CY              ;SOME FCNS DEFAULT AFTER TIMEOUT
            CALL    CK1SEC              ;1 SEC SINCE BRCST?
            CALL    NZ,BRCSTC           ;RESEND LAST DATA AND CONTROL INFO
            JP      MAIN                ;TRY AGAIN
;**********************
;ACTION REQUIRED
;CHECK FOR GOOD TC
;FIRST CHECK FOR GOOD CRC
CHKTC:      NOP
            LD      A,1
            LD      (OKTBCF),A          ;SET OK TO BROADCAST FLAG
            IN      A,(VFLAGS)
            AND     2                   ;GET CRC BIT
            JP      Z,RSETF             ;NO CRC SO RESET TRIAL FLAG
                                        ;ALSO SWEEP CLOCK RATE
;CRC OK SO CHECK SYNC BITS
            CALL    SYNCK
;SYNC OK SO READ VITC
            XOR     A
            LD      (ERRFLG),A          ;SHOW NO ERROR IN READING TC
            CALL    RVITC               ;OK SO READ IT
;VITIM AND VRTUB NOW HAVE PACKED NEW DATA
```

```
;GOOD TC SO CLEAR CONTROL TRACK INFO
        IN      A,(CTCTR)       ;IN TO CLEAR CNTRL COUNT
        XOR     A
        LD      (ESTFLG),A
        LD      (CTRTOT),A      ;ALSO CLEAR TOTAL
        INC     A
        LD      (CINBL),A       ;CANCEL INITIAL BLANK
        CALL    BRCSTC          ;BROADCAST TC
        CALL    MVTDSP          ;MOVE TO DISPLAY AREA
;CALCULATE THE DIFFERENCE IN THIS TC VALUE FROM THE LAST READING
;FIRST GET THE DIFFERENCE, THEN GET THE DIRECTION, CONVERT DIFFERENCE TO BINARY
;THEN SAVE THIS TC VALUE AS LAST READING FOR NEXT READING TO USE
GTDLTC: NOP                     ;GET DELTA TIME CODE
        LD      DE,VITIM        ;GET ADDR OF THIS TIME CODE READING
        LD      HL,REFTC        ;MAY BE SEVERAL READINGS AGO
        LD      BC,DLTATC       ;VALUE FOR DIFFERENCE, STORED AS TC
        CALL    SUBTC           ;DO SUBTRACTION AND PUT ANSWER
                                ;AT DLTATC
        CALL    TCTOBN          ;CONVERT TO BINARY COUNT, TAKING ONLY
                                ;MINS, SECS, FRS  SINCE WE SHOULD NOT
                                ;HAVE DIFFERENCES LARGER THAN THAT
        LD      (DLTABN),HL     ;SAVE BINARY COUNT
;HAVE DIFFERENCE SO GET DIRECTION
        CALL    GETDIR          ;CALCULATE DIRECTION(IF DIFF = 0 THEN
                                ;USE LAST DIRECTION)
                                ;LEAVES HL ALONE
;NOW SAVE THIS READING AS REFERENCE FOR NEXT VELOC CALC
UPDREF: LD      HL,VITIM        ;ADDR OF THIS READING
        LD      DE,REFTC        ;ADDR OF LAST READING
        LD      BC,4            ;LEN OF PACKED TC #'S
        LDIR                    ;MOVE INFO
        JP      MAIN
;
RSETIF: NOP
        XOR     A
        OUT     (VRDAD),A
        IN      A,(VRDDB)       ;DUMMY IN TO CLEAR TRIAL FLAG
        LD      A,002H
        OUT     (VRDAD),A       ;RESET ADDR
        LD      A,(ERRFLG)      ;SEE IF ERROR BEFORE
        AND     A
        JP      NZ,DOSWP        ;ERROR EXISTS SO CONTINUE SWEEP
;FIRST ERROR SO SET SWEEP
        LD      A,(CURSPD)      ;GET CURRENT SPEED
        LD      (LSTSPD),A      ;LAST VALID SPEED
        LD      (POSSPD),A      ;POSITIVE OFFSET SPEED
        LD      (NEGSPD),A      ;NEGITIVE OFFSET SPEED
        LD      A,MAXWT         ;INCLUDES DELAY FOR STAYING AT SAME SPEED
        LD      (SWPCT),A       ;SAVE SWEEP COUNT
;DO SWEEP
DOSWP:  NOP
        LD      B,SWPINC        ;AMOUNT TO BE ADDED OR SUB
        IN      A,(PSHB)        ;CHECK KEYS FOR SPEC CONDITION
        CPL
        AND     3CH             ;CLEAN IT UP
        CP      TCB_OR_LRCD     ;ONLY IF TC AND LINE READ PRESSED AT SAME TIME
        JP      Z,DOPLAY        ;PLAYSPEED
        LD      A,(SWPCT)       ;GET COUNT
        DEC     A
        LD      (SWPCT),A       ;SAVE NEW VAL
        CP      6
        JP      NC,DOLST        ;SEND +OR- NEAR LAST SPEED(NOT LAST SPEED)
        CP      5
        JP      Z,DOLST1        ;SEND LAST SPEED
        CP      4
        JP      Z,DOPOS         ;DO POSITIVE SWEEP
        CP      3
        JP      Z,DONEG         ;NEG SWEEP
        CP      2
        JP      Z,DOPLAY        ;PLAYSPEED
        CP      1
        JP      Z,DOPOS
```

```
;=0 SO RESET AND THEN DO NEG
         LD      A,6             ;1 MORE SINCE WILL BE DECR
         LD      (SWPCT),A       ;RESET COUNT
         JP      DONEG
DOPOS:   NOP
         LD      A,(POSSPD)      ;GET LAST POS SPEED
         ADD     A,B             ;ADD INCR
         CP      240             ;DON'T LET IT GET 2 BIG
         JP      C,*+6
         LD      A,(LSTSPD)      ;IF TO BIG USE LAST GOOD SPEED
         LD      (POSSPD),A      ;SAVE NEW SPEED
         JP      SNDSPD          ;OK SO SEND SPEED
DONEG:   NOP
         LD      A,(NEGSPD)      ;GET LAST NEG SPEED
         SUB     B               ;SUB INCR
         CP      15              ;DON'T LET IT GET 2 SMALL
         JP      NC,*+6
         LD      A,(LSTSPD)      ;IF TO SMALL USE LAST GOOD SPEED
         LD      (NEGSPD),A      ;SAVE NEW SPEED
         JP      SNDSPD          ;OK SO SEND SPEED
DOPLAY:  NOP
PLYCF    EQU     80H
                                 ;VALUE FOR PLAY SPEED
                                 ;1+.45 IS MAX, 1-.45 IS MIN. RANGE=.55-1.45
         LD      A,PLYCF
         JP      SNDSPD
DOLST:   NOP
         AND     1               ;SWEEP COUNT STILL IN A(I HOPE)
         JP      Z,*+7           ;IF 0 THEN ABOVE LAST SPEED
         LD      A,0
         SUB     B               ;MAKE A = NEG B
         LD      B,A             ;INTO B SO BELOW LAST SPEED
         LD      A,(LSTSPD)      ;GET LAST GOOD SPEED
         ADD     A,B
         JP      SNDSPD
DOLST1:  NOP
         LD      A,(LSTSPD)      ;GET LAST GOOD SPEED
         JP      SNDSPD
SNDSPD:  NOP
         OUT     (SPDCTL),A      ;SEND NEW SPEED
         LD      (CURSPD),A      ;SAVE CURRENT SPEED
         LD      A,1
         LD      (ERRFLG),A      ;SHOW ERROR IN READING TC
         JP      MAIN
;CNTRL PULSE READ IN SEE IF ENOUGH . UPDATE TC
;COUNT SHOULD AT LEAST BE 10(5 FRAMES)
UPCNT:   NOP
         LD      A,(CTRVAL)      ;VALUE READ IN
         AND     7FH             ;CLEAR OFF SIGN BIT
         LD      B,A
         LD      A,(CTRTOT)      ;GET TOTAL
         ADD     A,B             ;ADD NEW READING+TOTAL
         LD      (CTRTOT),A      ;SAVE NEW TOTAL
         LD      A,(CTRTOT)      ;GET TOTAL AGAIN
         CP      02              ;MUST HAVE AT LEAST 02 COUNTS
         CP      1               ;ALLOW ALL COUNTS, 1 PPF ESPECIALLY
         JP      Z,*+6           ;= SO OK
         JP      C,MAIN          ;NOT YET
         LD      A,(ESTFLG)
         AND     A
         JP      NZ,UPCNT1       ;ESTIMATING SO ADD EVERY TIME
         LD      A,(CTRTOT)      ;GET TOTAL AGAIN
         CP      10              ;MUST HAVE AT LEAST 10 COUNTS
         JP      C,MAIN          ;NOT YET
UPCNT1:  NOP
         XOR     A
         LD      (OVRFLW),A      ;RESET OVER FLOW FLAG
;SEE IF 1 OR 2 CONTROL TRACK PULSES PER FRAME
         IN      A,(CTPPF)
         AND     80H
         JP      NZ,UPXCT                        ;NZ=JPR ABSENT=1PPF
         LD      A,(CTRTOT)
```

```
            RRA                             ;DIV BY 2
            JP      NC,UPCNTX
            PUSH    AF
            LD      A,1
            LD      (OVRFLW),A              ;SET FLAG=OVER FLOW
            POP     AF
            JP      UPCNTX
UPXCT:      LD      A,(CTRTOT)
UPCNTX:     AND     7FH
;ENOUGH PULSES IN SO UPDATE TC
            LD      HL,O
            LD      L,A                     ;SET UP HL WITH TOTAL
            CALL    HLTC                    ;TC VALUE RETURNED IN ACC4
;CHECK IF DIRECTION IS AVAILABLE IN HDW OR NEEDS TO BE JUDGED FROM PREV TC
            IN      A,(DIPSW)
            AND     LDRSWB                  ;Z=SW ON=LEARN=USE DIRFLG
            JP      NZ,CLCNWT               ;CALC NW TIME
;USER WISHES TO SET CTRVAL MSB ACCORDING TO DIRFLG
            LD      A,(DIRFLG)              ;80H POSN
            LD      B,A
            LD      A,(CTRVAL)
            AND     7FH
            OR      B
            LD      (CTRVAL),A              ;SIGN NOW DUMMIED UP
CLCNWT:     LD      DE,VITIM
            LD      HL,ACC4
            LD      BC,VITIM
            LD      A,(CTRVAL)
            AND     80H                     ;SIGN OF DATA
            JP      Z,*+9                   ;FORWARD SO ADDTC
            CALL    SUBTC                   ;REWIND SO SUBTRACT TC
            JP      *+6
            CALL    ADDTC
;VITIM NOW HAS UPDATED TC
;DONT ALLOW NEGATIVE TIME CODE
            LD      HL,VITIM+3
            LD      A,(HL)
            AND     80H
            JP      Z,UPDOK                 ;POSITIVE TC IN BUFFER, OK
;CORRECT NEG TIME CODE
            LD      BC,VITIM
            LD      DE,VITIM
            LD      HL,TC24H                ;24 HRS
            CALL    ADDTC                   ;MAKES +24 HRS

LD      HL,VITIM+3              ;TRAP (-0) + (24) = +24, ILLEGAL
            LD      A,(HL)
            CP      24H
            JP      NZ,UPDOK
            LD      (HL),0

UPDOK:
            XOR     A
            LD      (CTRTOT),A              ;CLEAR TOTAL
            LD      A,1
            LD      (ESTFLG),A              ;SHOW ESTIMATING
            LD      A,(OKTBCF)              ;SEE IF OK TO BROADCAST
            AND     A
            JP      NZ,YESBC                ;OK SINCE VERT SYNC CAME IN
;NO VERT SYNC SO CHECK 60 CYCLE SEE IF TIME FOR NEW BROADCAST
            CALL    CK160                   ;Z ON RET MEANS COUNT HASNT HAPPENED
            JP      Z,NOBC
YESBC:      NOP
            XOR     A
            LD      (OKTBCF),A              ;RESET BRDCAST FLAG
            CALL    BRCSTC                  ;BROADCAST TC
NOBC:       CALL    MVTDSP                  ;MOVE TO DISPLAY AREA
            LD      A,(CTRTOT)              ;GET TOTAL
            LD      B,A                     ;SAVE TEMPORARILY
            LD      A,(OVRFLW)              ;GET OVERFLOW
            AND     A,B
            LD      (CTRTOT),A
```

```
            LD      A,1
            LD      (CINBL),A               ;CANCEL INITIAL BLANK
            JP      MAINX                   ;NOW SEE ABOUT DISPLAY
*********************
;SUBROUTINES
;
****
;
****
;GET DIRECTION FROM SIGN OF SUBTRACTION
;IF DIFFERENCE = 0 THEN USE SAME DIRECTION
GETDIR:     NOP
            LD      HL,(DLTABN)             ;GET BINARY COUNT
            CALL    HLZCK                   ;SEE IF VALUE = 0
            RET     Z                       ;YES SO DON'T CHANG SIGN
            LD      A,(TSIGN)               ;GET SIGN OF SUBTRACTION
            LD      (DIRFLG),A              ;SAVE AS DIRECTION
            RET
;
****
;SEE IF VALUE IN HL = 0
HLZCK:      NOP
            LD      A,L                     ;GET LS PART INTO ACC FOR COMPARE
            OR      H                       ;OR IN MS PART SO BOTH MUST = 0
                                            ;FOR ZERO FLAG TO BE SET
            RET
;
****
;SPECIAL 2SEC INITIAL DISPLAY OF SELF ID#
INIPOP:     NOP
            CALL    BLNKDP
PDPLUP:     IN      A,(VFLAGS)              ;NEED TO KEEP AUTO RESET HAPPY
            CALL    CK60CY
            IN      A,(BCADR)               ;XMIT ADR SW
            CPL
            AND     0FH
            CALL    IPTODB
            LD      A,(CTR60A)              ;CHECK TIME
            CP      240                     ;EXACTLY 2 SECS, 60 HZ MAINS
            JP      C,PDPLUP                ;COUNT <, TIME NOT UP
            LD      A,0
            LD      (CTR60A),A              ;ZERO RUNNING COUNT
            RET
;
****
;INSERT SPEC IP INTO BLANK DSPBUF
IPTODB:     NOP
            ADD     A,0                     ;CONVERT HEX TO BCD
            DAA
            LD      B,A
            AND     0FH
            LD      (DSPBUF),A              ;NUMERIC CODE IN RH DSP DIGIT
            LD      A,B
            RRCA
            RRCA
            RRCA
            RRCA
            AND     0FH
            JP      NZ,SVIP1                ;NOT LEADING 0
            LD      A,0FH                   ;BLANK CODE, SUPPRESS LDG 0
SVIP1:      LD      (DSPBUF+1),A            ;MS DIGIT
            LD      HL,DSPBUF+7
            LD      (HL),0EH                ;CODE FOR "P"
            DEC     HL
            LD      (HL),0                  ;LOOKS LIKE 0
            DEC     HL
            LD      (HL),5                  ;LOOKS LIKE "S"
            DEC     HL
            LD      (HL),0AH                ;"-"
            DEC     HL
            LD      (HL),0FH                ;BLANK
            DEC     HL
            LD      (HL),0FH                ;BLANK
```

```
                CALL    DSPL
                RET
;
;READ VERTICAL INT TC
;EVERYTHINGS OK SINCE ALREADY CHECKED
RVITC:  NOP
        LD      A,0
        OUT     (VRDAD),A       ;SELECT LD       (RT ADDR
        LD      HL,VITIM+3      ;STORE FOR VERT INT TIME CODE
        LD      DE,VRTUB+3      ;USER BITS
        CALL    HFGET           ;GET FIRST 2SETS OF UB AND HRS
        CALL    MSGET           ;GET NEXT UB AND MINS
        CALL    MSGET           ;SECS
        CALL    HFGET           ;FRAMES
;NOW GO FETCH IN THE FIELD BIT.
;FOR SMPTE, BIT LOC IS BIT #35 (80 SECS) ADR 2EH FOR THE READER
;FOR EBU, BIT IS #75 (80 HRS)          ADR 6 (7 ON GEN)
        LD      A,(TCMD)
        CP      25H                     ;EBU FMT
        LD      A,06H                   ;ASSUME EBU (PAL)
        JP      Z,GTFLBT                ;ASSUMPTION CORRECT
;HERE, 24 OR 30 FRAME FMTS, USE SMPTE FLD BIT
        LD      A,02EH                  ;2E
GTFLBT: NOP
        OUT     (VRDAD),A       ;SELECT IT
        IN      A,(VRODB)       ;GET BIT
        AND     1
        LD      (FLDMK),A       ;SAVE FIELD MARK
;JAM FRAME 1SHOT
JMFRM:  NOP             ;1=CLR FLDS 2,4
        JP      Z,NOFRPL        ;NO PULS RQD
        LD      A,(LSTPLS)      ;PREVENT PULSING EVERY FLD ON STILL
        AND     A               ;1=WE DID IT LAST TIME TOO
        JP      NZ,NOFRPL       ;NO PULS NOW, HADONE LAST TIME
        INC     A               ;WAS 0, NOW 1
        LD      (LSTPLS),A      ;SHOW PULSE THIS TIME
        IN      A,(FRMCLR)      ;PULSE TO CLEAR 1SHOT
        JP      GTCFBT
NOFRPL: XOR     A               ;SHOW NO PULSE
        LD      (LSTPLS),A
;RESUME ROG
GTCFBT: LD      A,42H           ;ADDR OF COL FRAME
        OUT     (VRDAD),A       ;SELECT IT
        IN      A,(VRODB)       ;GET BIT
        AND     1
        LD      (CFFLG),A       ;SAVE COLOR FRAME BIT
        LD      A,43H           ;ADDR OF DROP FRAME BIT
        OUT     (VRDAD),A       ;SELECT IT
        IN      A,(VRODB)       ;GET BIT
        AND     1
        LD      (DFFLG),A       ;SAVE DROP FRAME FLAG
        CALL    CLCTCM          ;CALC TC MODE 25,30
        CALL    CORTC           ;CORRECT TC IF NEEDED
        CALL    CORUB           ;CORRECT UB IF NEEDED
;IF PAL, MAY HAVE 4 OR 8 FIELD SEQUENCE
        LD      A,(TCMD)
        CP      25H
        JP      Z,CLFRS         ;PAL SO DO DIFFERENTLY
;NTSC, CHECK COLOR FRAMING
        LD      A,(CFFLG)       ;GET COL FR FLAG
        AND     A
        JP      Z,ADONE         ;NOT SET SO JUST DISP FIELD

;COLOR FRAMING ON, NTSC
;NTSC (SMPTE) COLOR IDENT
        LD      A,(VITIM)       ;GET FRAMES
        AND     1
        JP      Z,ADONE         ;EVEN SO ONLY DISP 1,2
        LD      A,(FLDMK)       ;GET BIT
        AND     A,3
        LD      (FLMKN),A       ;SAVE FIELD MARK #
```

```
FXADR:  LD      A,0D2H          ;FIX ADDRESS OF READER
        OUT     (VRDAD),A       ;RESET ADDR POINTER
        RET
AOONE:  NOP
        LD      A,(FLDMK)
        ADD     A,1
        LD      (FLMKN),A       ;SAVE FEILD MARK #
        JP      FXADR
****
;FUNCTIONS CALCULATED BY VAN DAEL
;E.S.U. REVIEW DEC 78
;4/22/82, G3 JUDGED UNNECESSARY
;FORM    X X X X    X X G2 G1
;THEN FIELDS 1,2 ARE "3"   3,4;"2"   5,6;"1"   7,8;"0"
CLFRS:  NOP
        LD      A,(VITIM)
                ;WORK IN 2**1 BIT POSN
        LD      D,A             ;SAVE IT(F2)
        ;D HOLDS FRAMES
        RRCA
        RRCA
        RRCA                    ;ALIGN F10
        XOR     D               ;F2 XOR F10
        LD      B,A             ;SAVE IT
        LD      A,(VITIM+1)     ;S2
        LD      E,A
        ;E HOLDS SECS
        XOR     B               ;F2 XOR F10 XOR S2
        LD      B,A             ;SAVE IT
        LD      A,E             ;RESTORE SEC
        RRCA
        RRCA
        RRCA                    ;S10
        XOR     B               ;F2 XOR F10 XOR S2 XOR S10
        LD      B,A             ;SAVE IT

;FORM F1 + S1
        LD      A,D             ;F1
        OR      E               ;S1 OR F1
        RLCA    ;TO WORK IN 2**1 POSN
        ;COMBINE FOR G2
        XOR     B
        AND     2
        LD      H,A             ;SAVE G2 IN 2**1 BIT

LD      A,0             ;TIMCTR
        XOR     E               ;F1 XOR S1
        AND     1
        LD      L,A             ;L HAS G1 IN LSB

;4 OR 8FIELD SEQUENCE?
        LD      A,(CFFLG)
        AND     A
        LD      A,2             ;DUMMY UP G2=1
        JP      NZ,*+4          ;SET SO ALLOW FULL 8 FIELD SEQUENCE
        LD      H,A             ;DUMMIES UP CODES 3,2 FOR FLDS1-4
;G1,G2,  SETUP NOW FIND #
        LD      A,H             ;2*G2
        OR      L               ;OR IN G1

;SINCE G2,G1 CODES FOR FIELDS 1,2 ARE "3"   3,4;"2"   5,6;"1"   7,8;"0"
;COMPLEMENTED, GET                          0           1           2           3
;SHIFT 1 LEFT, GET                          0           2           4           6
;ADD 1+FLMK, GET ANSWER
        CPL
        RLCA
        AND     6
        INC     A
        LD      E,A             ;SAVE #
        LD      A,(FLDMK)       ;0 OR 1
        AND     A,E             ;NOW HAVE 1-8
        LD      (FLMKN),A
        JP      FXADR           ;DONE SO EXIT READER
```

```
;GET HRS, FR AND CORRESPONDING USER BITS
HFGET:  NOP
        IN      A, (VRDDB)
        IN      A, (VRDDB)
        LD      B, 0
        LD      C, 0            ;RESET TC AND UB COUNTERS
        CALL    GTUB            ;GET FIRST HALF OF USER BITS
        CALL    GTHF            ;GET TENS COL
        IN      A, (VRDDB)
        IN      A, (VRDDB)
        LD      A, C
        RLCA
        LD      C, A
        CALL    GTUB            ;GET USER BITS
        LD      A, B
        RLCA
        LD      B, A
        CALL    GTUNT           ;GET THEM
        LD      (HL), B            ;SAVE TC
        LD      A, C
        LD      (DE), A            ;SAVE UB
        DEC     HL
        DEC     DE              ;NEXT STORE LOC
        RET
MSGET:  NOP
        IN      A, (VRDDB)
        IN      A, (VRDDB)
        LD      B, 0
        LD      C, 0            ;RESET TC AND UB COUNTERS
        CALL    GTUB            ;GET FIRST HALF OF USER BITS
        CALL    GTMS            ;GET TENS COL
        IN      A, (VRDDB)
        IN      A, (VRDDB)
        LD      A, C
        RLCA
        LD      C, A
        CALL    GTUB            ;GET USER BITS
        LD      A, B
        RLCA
        LD      B, A
        CALL    GTUNT           ;GET THEM
        LD      (HL), B            ;SAVE TC
        LD      A, C
        LD      (DE), A            ;SAVE UB
        DEC     HL
        DEC     DE              ;NEXT STORE LOC
        RET
GTUB:   NOP
        IN      A, (VRDDB)
        AND     1
        OR      C
        RLCA
        LD      C, A
        IN      A, (VRDDB)
        AND     1
        OR      C
        RLCA
        LD      C, A
        IN      A, (VRDDB)
        AND     1
        OR      C
        RLCA
        LD      C, A
        IN      A, (VRDDB)
        AND     1
        OR      C
        LD      C, A
        RET
GTUNT:  NOP
        IN      A, (VRDDB)
        AND     1
        OR      B
```

```
           RL_CA
           LD      B, A
           IN      A, (VRDDB)
           AND     1
           OR      3
           RL_CA
           LD      3, A
           IN      A, (VRDDB)
           AND     1
           OR      B
           RL_CA
           LD      B, A
           IN      A, (VRDDB)
           AND     1
           OR      8
           LD      B, A
           RET
GTHF:      NOP
           IN      A, (VRDDB)
           IN      A, (VRDDB)    ;FIRST 2 BITS NOT USED
           IN      A, (VRDDB)
           AND     1
           OR      3
           RL_CA
           LD      3, A
           IN      A, (VRDDB)
           AND     1
           OR      B
           LD      3, A
```

What is claimed is:

1. In apparatus for reading coded information recorded on video magnetic tape, said apparatus having means for reading signals from said tape as said tape is run at different speeds, a local oscillator for generating sampling signals of various frequencies, means responsive to said sampling signals for sampling said signals read from said tape to produce received information and an error checking circuit responsive to said received information for generating a signal indicating an error in the reception of said information, the improvement comprising, means responsive to said error signal for adjusting the frequency of said sampling signals to produce error-free reception of said information.

2. In apparatus for reading coded information recorded on video magnetic tape, the improvement according to claim 1 wherein said adjusting means comprises means for changing said oscillator frequency to a plurality of different frequencies in a predetermined pattern and means for controlling said reading apparatus to attempt to read said information at each of said plurality of frequencies.

3. In apparatus for reading coded information recorded on video magnetic tape, the improvement according to claim 2 wherein said changing means is responsive to said error signal after an attempt has been made to read said information for changing said oscillator frequency to a different frequency in accordance with said pattern.

4. In apparatus for reading coded information recorded on video magnetic tape, the improvement according to claim 2 wherein at least one of said plurality of frequencies is a frequency corresponding to normal playback tape speed.

5. In apparatus for reading coded information recorded on video magnetic tape, the improvement according to claim 2 wherein at least one of said plurality of frequencies is a frequency which had previously produced error-free reception of said information.

6. Apparatus for reading information encoded in a video signal recorded on video magnetic tape, said apparatus comprising:

means for reading signals from said tape as said tape is run at different speeds, a variable-frequency oscillator for producing sampling signals;

means responsive to said sampling signals for periodically sampling said signals read from said tape to produce received information;

means responsive to said received signals for generating an error signal if said information has not been received properly; and means responsive to said error signal for adjusting the frequency of said oscillator to produce error-free reception of said information.

7. Apparatus for reading information encoded in a video signal recorded on video magnetic tape according to claim 6 wherein said information recorded on said tape includes an error checking code and said error signal generating means is responsive to said error checking code for generating said error signal.

8. Apparatus for reading information encoded in a video signal recorded on video magnetic tape according to claim 7 wherein said error checking code is a CRC error checking code.

9. Apparatus for reading information encoded in a video signal recorded on video magnetic tape according to claim 6 wherein said adjusting means comprises means for changing said oscillator frequency to a plurality of different frequencies in a predetermined pattern and means for controlling said reading apparatus to attempt to read said information at each of said plurality of frequencies.

10. Apparatus for reading information encoded in a video signal recorded on video magnetic tape according to claim 9 wherein said changing means is responsive to said error signal after an attempt has been made to read said information for changing said oscillator frequency to a different frequency in accordance with said pattern.

11. Apparatus for reading information encoded in a video signal recorded on video magnetic tape according to claim 9 wherein at least one of said plurality of frequencies is a frequency corresponding to normal playback tape speed.

12. Apparatus for reading information encoded in a video signal recorded on video magnetic tape according to claim 9 wherein at least one of said plurality of frequencies is a frequency which had previously produced error-free reception of said information.

13. Apparatus for reading address information, including an error detecting code, encoded in a video signal recorded on video magnetic tape, said apparatus comprising,
- a digital-to-analog converter responsive to a digital command word for producing a corresponding analog output voltage;
- a voltage controlled oscillator responsive to different values of said analog output voltage for producing sampling signals at different frequencies;
- means responsive to said sampling signals for periodically sampling said recorded video signal to produce received signals;
- error code checking means responsive to said received signals for generating an error signal if said address information has not been received properly; and
- computer means responsive to said error signal for generating a digital command word to change said oscillator frequency to different frequency.

14. Apparatus for reading address information, including an error detecting code, encoded in a video signal recorded on video magnetic tape according to claim 13 wherein said video signal includes vertical and horizontal synchronization pulses and said apparatus further comprises means responsive to said vertical synchronizing signal for controlling said sampling means to sample said video signal a predetermined number of times and means for temporarily storing each one of said set of video signal samples.

15. Apparatus for reading address information, including an error detecting code, encoded in a video signal recorded on video magnetic tape according to claim 14 wherein said error code checking means is responsive to said predetermined number of samples for generating said error signal if said address information has not been received properly.

16. Apparatus for reading address information, including an error detecting code, encoded in a video signal recorded on video magnetic tape according to claim 15 wherein said computer means is responsive to said error signal for commanding said controlling means to resample said video signal to produce another set of samples.

17. Apparatus for reading address information, including an error detecting code, encoded in a video signal recorded on video magnetic tape according to claim 16 wherein said computer means is responsive to the occurrence of at least two error signals for generating digital command words to change said oscillator frequency to a plurality of different frequencies in a predetermined pattern and for controlling said reading apparatus to attempt to read said information at each of said plurality of frequencies.

18. Apparatus for reading address information, including an error detecting code, encoded in a video signal recorded on video magnetic tape according to claim 17 wherein said predetermined frequency pattern comprises a frequency corresponding to normal playback tape speed, a frequency which is slightly higher than the frequency which resulted in said error signal, a frequency which is slightly lower than the frequency which caused said error signal, a frequency which had previously produced error-free reception of said information, a frequency which is slightly higher than the frequency which resulted in said error signal, and a frequency which is slightly lower than the frequency which caused said error signal.

19. Apparatus for reading address information, including a CRC error detecting code, encoded in a video signal including vertical and horizontal synchronization pulses recorded on video magnetic tape, said apparatus comprising,
- means for reading video signals from said tape as said tape is run at different speeds;
- a digital-to-analog converter responsive to a digital command word for producing a corresponding analog output voltage;
- a voltage controlled oscillator responsive to different values of said analog output voltage for producing sampling signals at different frequencies;
- a bit latch responsive to said sampling signals for periodically sampling said video signals to produce received signals;
- means responsive to said vertical synchronizing signal for controlling said bit latch to sample said video signal a predetermined number of times to produce a set of trial signals;
- CRC error code checking means responsive to said set of trial signals for generating an error signal if said address information in said set of trial signals has not been received properly;
- means responsive to an error signal for commanding said controlling means to produce a plurality of sets of trial signals; and
- computer means responsive to at least two of said error signals for generating a digital command word to change said oscillator frequency to different frequency.

20. Apparatus for reading address information, including a CRC error detecting code, encoded in a video signal including vertical and horizontal synchronization pulses recorded on video magnetic tape according to claim 19 further comprising means for temporarily storing each set video signal samples and means responsive to said error signal for reading said video signal samples out of said temporary storage means if said address information has been received properly.

21. Apparatus for reading address information, including a CRC error detecting code, encoded in a video signal including vertical and horizontal synchronization pulses recorded on video magnetic tape according to claim 20 wherein said computer means is responsive to the occurrence of at least two error signals for generating digital command words to change said oscillator frequency to a plurality of different frequencies in a predetermined pattern and for controlling said reading apparatus to attempt to read said information at each of said plurality of frequencies.

22. Apparatus for reading address information, including a CRC error detecting code, encoded in a video signal including vertical and horizontal synchronization pulses recorded on video magnetic tape according to claim 21 wherein said predetermined frequency pattern comprises a first frequency corresponding to normal playback tape speed, a second frequency which is slightly higher than the frequency which resulted in said error signal, a third frequency which is slightly lower than the frequency which caused said error signal, a fourth frequency which had previously produced error-free reception of said information, a fifth frequency which is slightly higher than the frequency which resulted in said error signal, and a sixth frequency which is slightly lower than the frequency which caused said error signal.

23. Apparatus for reading address information, including a CRC error detecting code, encoded in a video signal including vertical and horizontal synchronization pulses recorded on video magnetic tape according to claim 22 wherein said second frequency is 2 percent higher than said frequency which caused the error signal and said third frequency is 2 percent lower than said frequency which caused the error signal.

24. Apparatus for reading address information, including a CRC error detecting code, encoded in a video signal including vertical and horizontal synchronization pulses recorded on video magnetic tape according to claim 23 wherein said fifth frequency is 4 percent higher than said frequency which caused the error signal and said sixth frequency is 4 percent lower than said frequency which caused the error signal.

25. Apparatus for reading address information, including a CRC error detecting code, encoded in a video signal including vertical and horizontal synchronization pulses recorded on video magnetic tape according to claim 24 wherein said computer means is responsive to the occurrence of an error signal when said oscillator frequency is equal to said sixth frequency for repeating said frequency changing pattern until said address signals are properly received.

* * * * *